United States Patent
Wares

(10) Patent No.: US 10,804,837 B2
(45) Date of Patent: Oct. 13, 2020

(54) SUN TRACKING SOLAR ENERGY COLLECTION SYSTEM AND METHOD OF ASSEMBLY

(71) Applicant: SUNPOWER CORPORATION, San Jose, CA (US)

(72) Inventor: Brian Wares, San Francisco, CA (US)

(73) Assignee: SunPower Corporation, San Jose, CA (US)

(*) Notice: Subject to any disclaimer, the term of this patent is extended or adjusted under 35 U.S.C. 154(b) by 42 days.

(21) Appl. No.: 15/081,320

(22) Filed: Mar. 25, 2016

(65) Prior Publication Data
US 2017/0279405 A1    Sep. 28, 2017

(51) Int. Cl.
| | |
|---|---|
| *H02S 20/32* | (2014.01) |
| *F24S 25/65* | (2018.01) |
| *F24S 30/425* | (2018.01) |
| *H02S 30/10* | (2014.01) |
| *F24S 25/60* | (2018.01) |
| *F24S 25/10* | (2018.01) |

(Continued)

(52) U.S. Cl.
CPC .............. *H02S 20/32* (2014.12); *F24S 25/65* (2018.05); *F24S 30/425* (2018.05); *H02S 30/10* (2014.12); *F24S 25/10* (2018.05); *F24S 25/60* (2018.05); *F24S 25/617* (2018.05); *F24S 2030/12* (2018.05); *Y02E 10/47* (2013.01)

(58) Field of Classification Search
CPC ..... H02S 20/30–32; H02S 30/10; F24J 2/541; F24S 2025/802; F24S 25/634–636; F24S 30/42–428; F24S 25/10; F24S 25/60; F24S 25/65; F24S 25/617; F24S 30/425; F16B 7/0493
See application file for complete search history.

(56) References Cited

U.S. PATENT DOCUMENTS

| | | | | |
|---|---|---|---|---|
| 2004/0168294 | A1* | 9/2004 | Malaka | B21J 15/02 29/509 |
| 2013/0153007 | A1* | 6/2013 | Plesniak | H01L 31/0422 136/251 |

(Continued)

FOREIGN PATENT DOCUMENTS

| | | | | |
|---|---|---|---|---|
| CN | 104969464 A | 10/2015 | | |
| WO | WO-2010055397 A2 * | 5/2010 | | F24J 2/1057 |

(Continued)

OTHER PUBLICATIONS

First Office Action from Chinese Patent Application No. 2016109633206 dated Oct. 21, 2019, 10 pgs.

(Continued)

*Primary Examiner* — William E McClain
(74) *Attorney, Agent, or Firm* — Schwabe, Williamson & Wyatt, P.C.

(57) ABSTRACT

Various systems and methods enabling low cost solar tracker systems including lower cost mounting assemblies and fasteners are described herein. Reducing the material, manufacturing costs and/or labor required for assembly of solar tracker components can present significant reductions in the cost of solar tracker systems. In an embodiment, a hollow fastener can significantly lower the cost of solar tracker mounting and coupling assemblies while still maintaining strength and structural integrity of the solar tracker system.

20 Claims, 10 Drawing Sheets

(51) Int. Cl.
*F24S 25/617* (2018.01)
*F24S 30/00* (2018.01)

(56) References Cited

U.S. PATENT DOCUMENTS

| | | | | |
|---|---|---|---|---|
| 2013/0153519 | A1* | 6/2013 | Ashmore | F24J 2/5232 211/1.54 |
| 2014/0076480 | A1* | 3/2014 | Kalus | F24S 30/425 156/91 |
| 2014/0117190 | A1* | 5/2014 | Werner | F24J 2/14 248/346.03 |
| 2014/0216522 | A1* | 8/2014 | Au | H01L 31/0522 136/246 |
| 2014/0261626 | A1* | 9/2014 | Ripoll Agullo | H02S 20/00 136/246 |
| 2015/0092383 | A1* | 4/2015 | Corio | H02S 20/10 361/807 |
| 2016/0329860 | A1* | 11/2016 | Kalus | H02S 20/32 |
| 2017/0294873 | A1* | 10/2017 | Mori | H02S 20/32 |

FOREIGN PATENT DOCUMENTS

| | | | | |
|---|---|---|---|---|
| WO | WO-2011071253 | A2 * | 6/2011 | ............. F24J 2/5232 |
| WO | WO-2017097712 | A1 * | 6/2017 | ............. F24S 25/13 |
| WO | WO-2017097718 | A1 * | 6/2017 | ............. F24S 25/13 |

OTHER PUBLICATIONS

Second Office Action from Chinese Patent Application No. 2016109633206 dated Jun. 11, 2020, 12 pgs.

* cited by examiner

SUN TRACKING SOLAR ENERGY COLLECTION SYSTEM AND METHOD OF ASSEMBLY

BACKGROUND

Some known sun-tracking photovoltaic solar power systems, such as utility-scale, photovoltaic installations, are designed to pivot a large number of solar modules so as to track the movement of the sun using the fewest possible number of drive motors. For example, some known systems include parallel rows of photovoltaic modules supported on torque tubes. The torque tubes can comprise a number of long, round shafts connected together in an end to end fashion, typically fabricated out of metal.

As such, the torque tubes and some of the associated hardware can present a substantial cost of a sun tracking solar power system. Thus, reducing the material, manufacturing costs and/or labor required for assembly of such components can present significant reductions in the cost of financing the initial construction of such a system. Reducing the construction cost of such systems can significantly impact the ability to attain financing for such systems, the servicing of which is sufficiently low to allow such a system to sell electricity, for example, to a regional grid power distribution system, at a rate that is sufficiently high to cover the debt servicing for such initial construction.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers. The figures are not drawn to scale.

DETAILED DESCRIPTION

Figure 1:
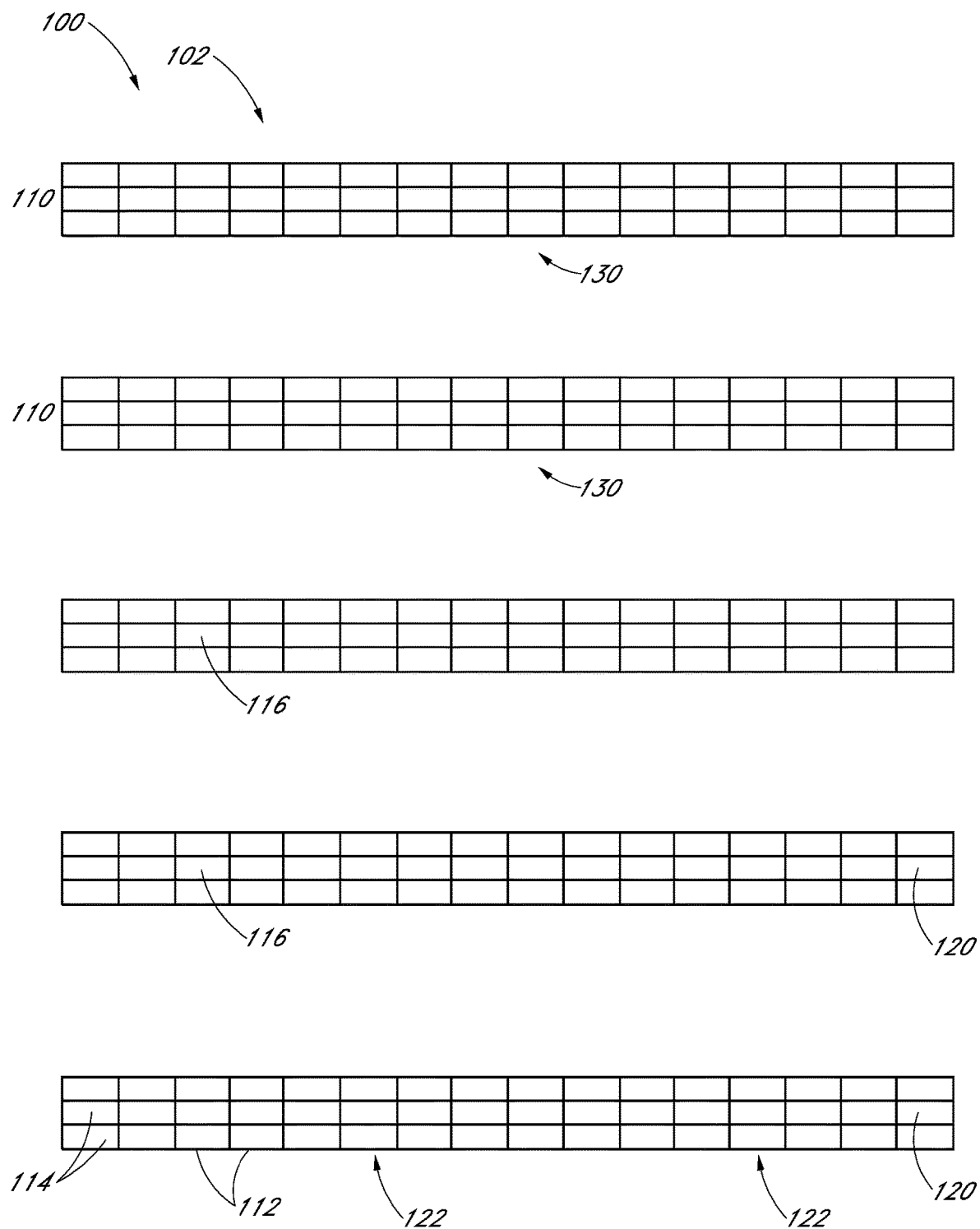
FIG. 1 illustrates a top-down view of a solar collection system, according to an embodiment.

The following detailed description is merely illustrative in nature and is not intended to limit the embodiments of the subject matter of the application or uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Certain terminology may be used in the following description for the purpose of reference only, and thus are not intended to be limiting. For example, terms such as "upper", "lower", "above", and "below" refer to directions in the drawings to which reference is made. Terms such as "front", "back", "rear", "side", "axial", and "lateral" describe the orientation and/or location of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second", and other such numerical terms referring to structures do not imply a sequence or order unless clearly indicated by the context.

Terminology—The following paragraphs provide definitions and/or context for terms found in this disclosure (including the appended claims):

This specification includes references to "one embodiment" or "an embodiment." The appearances of the phrases "in one embodiment" or "in an embodiment" do not necessarily refer to the same embodiment. Particular features, structures, or characteristics can be combined in any suitable manner consistent with this disclosure.

This term "comprising" is open-ended. As used in the appended claims, this term does not foreclose additional structure or steps.

Various units or components may be described or claimed as "configured to" perform a task or tasks. In such contexts, "configured to" is used to connote structure by indicating that the units/components include structure that performs those task or tasks during operation. As such, the unit/component can be said to be configured to perform the task even when the specified unit/component is not currently operational (e.g., is not on/active). Reciting that a unit/circuit/component is "configured to" perform one or more tasks is expressly intended not to invoke 35 U.S.C. § 112, sixth paragraph, for that unit/component.

As used herein, the terms "first," "second," etc. are used as labels for nouns that they precede, and do not imply any type of ordering (e.g., spatial, temporal, logical, etc.). For example, reference to a "first" encapsulant layer does not necessarily imply that this encapsulant layer is the first encapsulant layer in a sequence; instead the term "first" is used to differentiate this encapsulant from another encapsulant (e.g., a "second" encapsulant).

The terms "a" and "an" are defined as one or more unless this disclosure explicitly requires otherwise.

The following description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically.

As used herein, "inhibit" is used to describe a reducing or minimizing effect. When a component or feature is described as inhibiting an action, motion, or condition it may completely prevent the result or outcome or future state completely. Additionally, "inhibit" can also refer to a reduction or lessening of the outcome, performance, and/or effect which might otherwise occur. Accordingly, when a component, element, or feature is referred to as inhibiting a result or state, it need not completely prevent or eliminate the result or state.

As used herein, the term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the terms "substantially," "approximately," and "about" may be substituted with "within [a percentage] of" what is specified, where the percentage includes 0.1, 1, 5, and 10 percent.

As used herein, "regions" can be used to describe discrete areas, volumes, divisions or locations of an object or material having definable characteristics but not always fixed boundaries.

In the following description, numerous specific details are set forth, such as specific operations, in order to provide a thorough understanding of embodiments of the present disclosure. It will be apparent to one skilled in the art that embodiments of the present disclosure may be practiced without these specific details. In other instances, well-known techniques are not described in detail in order to not unnecessarily obscure embodiments of the present invention. The feature or features of one embodiment can be applied to other embodiments, even though not described or illustrated, unless expressly prohibited by this disclosure or the nature of the embodiments.

During normal operation, solar tracker systems can experience high wind loads and other environmental encumbrances. Over its operational lifetime, a solar tracker system and its associated torque tubes, support assemblies and mounting assemblies must maintain structural integrity which can present a substantial cost. Thus, reducing the material, manufacturing costs and/or labor required for assembly of such components can present significant reductions in the cost of solar tracker systems. Various systems and methods enabling low cost solar tracker systems including lower cost mounting assemblies and fasteners are described herein.

Although many of the examples described herein are for sun-tracking solar energy collection systems, the techniques and structures apply equally to other non-sun-tracking or stationary solar energy collection systems, as well as concentrated photovoltaic solar systems and concentrated thermal solar systems, etc. Moreover, although much of the disclosure is described in terms of ground-mounted sun-tracking energy collection solar installations for ease of understanding, the disclosed techniques and structures apply equally to other solar energy collection installations (e.g., rooftop solar installations).

FIG. 1 illustrates a top-down view of a solar collection system 100, which can be considered an electricity farm. The solar collection system 100 includes a solar collector array 102 which includes a plurality of tracker rows 110. Each tracker row 110 comprises a plurality of solar collection modules 112 supported by a torque member, a drive shaft or a torque tube 120. Each of the solar collection modules 112 can include one or a plurality of solar collecting devices or members 114. The solar collecting devices or members 114 have an upper surface 116 (visible in FIG. 1) which is configured to receive sunlight for conversion into electrical energy.

The solar collection devices 114 can be in the form of photovoltaic modules, thermal solar collection devices, concentrated photovoltaic devices, or concentrated thermal solar collection devices. In the illustrated embodiment, the solar collection devices 114 are in the form of non-concentrated, photovoltaic (PV) modules. The photovoltaic modules 112 can include one or more photovoltaic cells, encased in a frame assembly including an optically transparent upper cover and a peripheral frame. In one embodiment, solar modules 112 can comprise a support frame connected to the lower surface of the solar collection member 114. The design and structure of such photovoltaic modules are known in the art are thus are not described in further detail.

In the embodiment pictured in FIG. 1, each tracker row 110 includes a tracking drive 130 connected to the torque tube 120 and configured to pivot the torque tube 120 so as to cause the collector devices 114 to track the movement of the sun. However in other embodiments, torque tubes 120 of each tracker row 110 can be mechanically linked to a single tracking drive such that a single tracking drive pivots torque tubes 120 of trackers rows 110 simultaneously so as to cause the collector devices 114 to track the movement of the sun.

Figure 2:
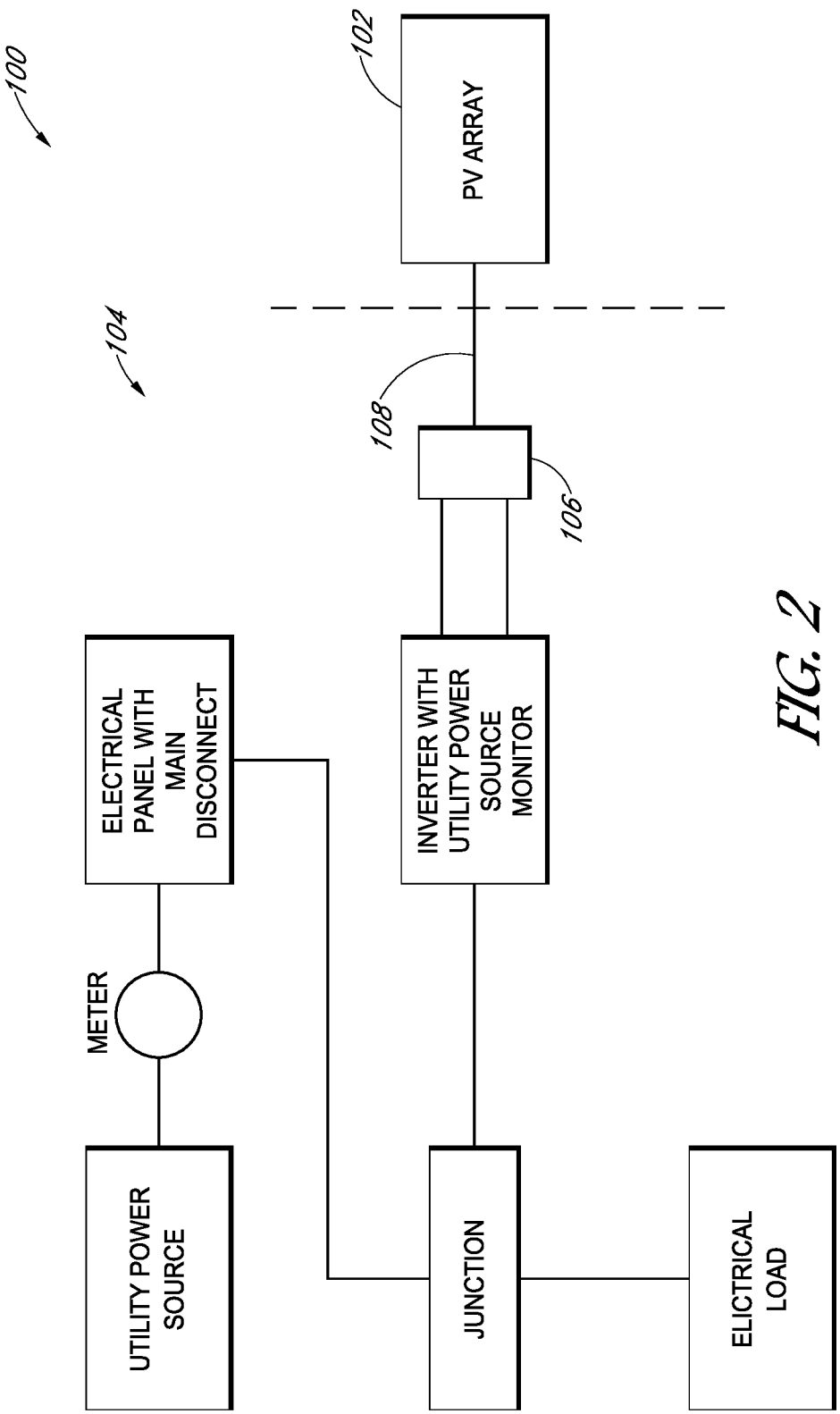
FIG. 2 is a schematic diagram of an electrical system for a solar collection system, according to an embodiment.

With reference to FIG. 2, solar collection system 100 can further include an electrical system 104 connected to the array 102. For example, the electrical system 104 can include the array 102 as a power source connected to a remote connection device 42 with power lines 108. The electrical system 104 can also include a utility power source, a meter, an electrical panel with a main disconnect, a junction, electrical loads, and/or an inverter with the utility power source monitor.

Figure 3:
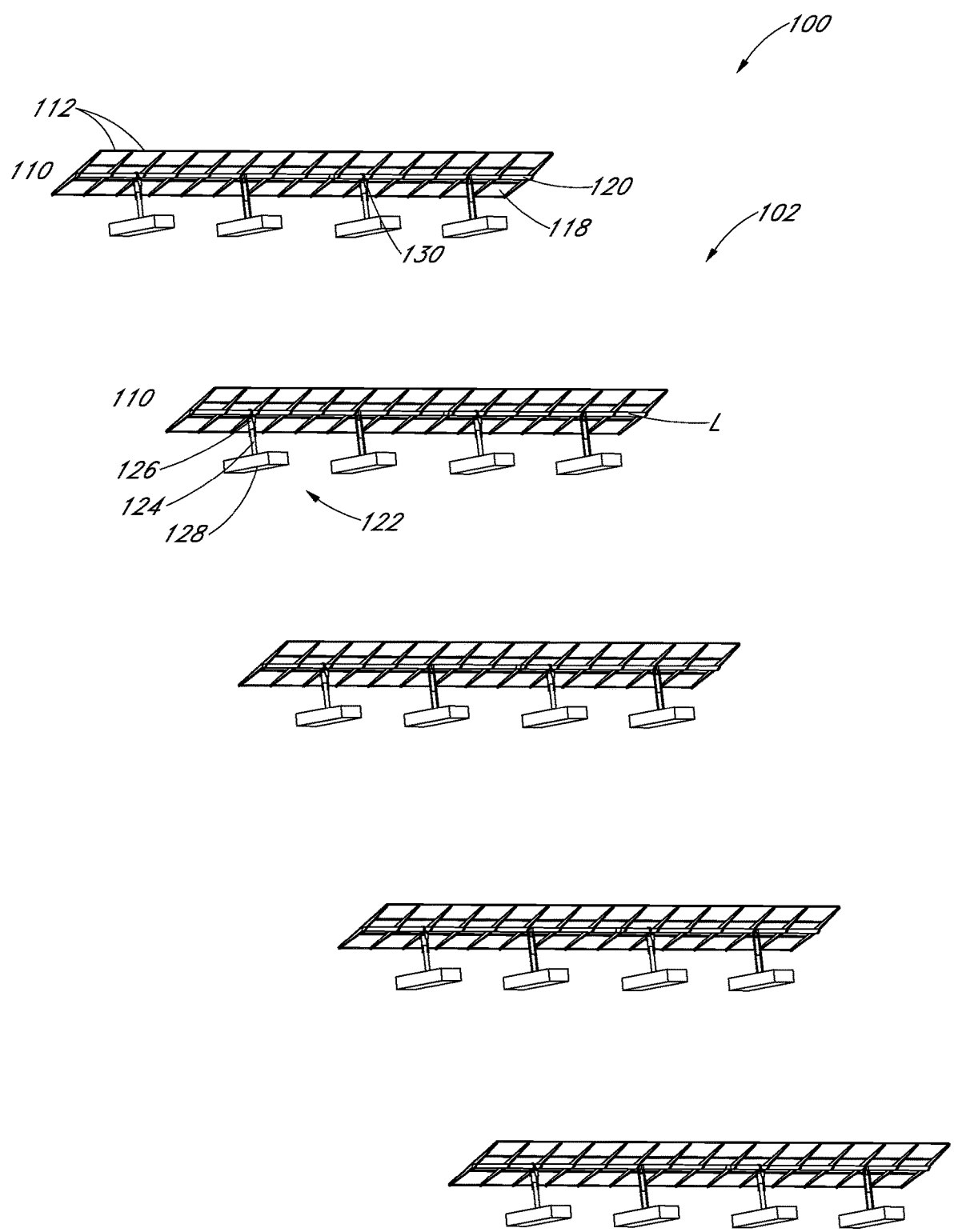
FIG. 3 illustrates a side perspective view of a solar collection system, according to an embodiment.

FIG. 3 illustrates a side perspective view of the array 102 with tracker rows 110 tilted such that lower surfaces 118 of the plurality of solar modules 114 are visible. Each of the torque tubes 120 are supported above the ground by a ground support assembly 122. Each ground support assembly 122 includes a pile 124 and a bearing 126 supported at the upper end of the pile 124. In some embodiments, the ground support assembly can include a concrete slab 128 as depicted in FIG. 3. The torque tube 120 can be of any length and can be formed in one or more pieces or sections. The spacing of the piles 124, relative to one another, can be determined based on the desired limits on deflection of the torque tubes 120 between the support structures 122, wind loads, and other factors.

In an embodiment, the torque member or tube has a longitudinal axis L supported above the ground so as to be pivotable through a range of pivot motion of at least about 20° of rotation about the longitudinal axis L. The torque tube 120 can have a solid or cylindrical body, extending along a longitudinal axis L. The cylindrical body can have any cross-sectional shape, including but without limitation, round, square, triangular, rectangular, polygonal, or other shapes. Thus, as used herein, the term "cylindrical" is intended to mean "a surface or solid bounded by two parallel or skewed planes and generated by a straight line moving parallel to the given planes and tracing a closed shape with any number of curved and/or straight segments, bounded by the planes and lying in a plane perpendicular or oblique to the given planes."

In an embodiment, the torque tube comprises a number of long, round shafts connected together in an end to end fashion and can be fabricated out of metal. In an embodiment, the torque tube can be provided with a minimal amount of material to maintain structural integrity, thereby reducing related costs. In one non-limiting example, the torque tube can have a cylindrical wall with a thickness less than 0.75 cm. As another example, the torque tube can have a diameter greater than 10 centimeters.

Figure 4:
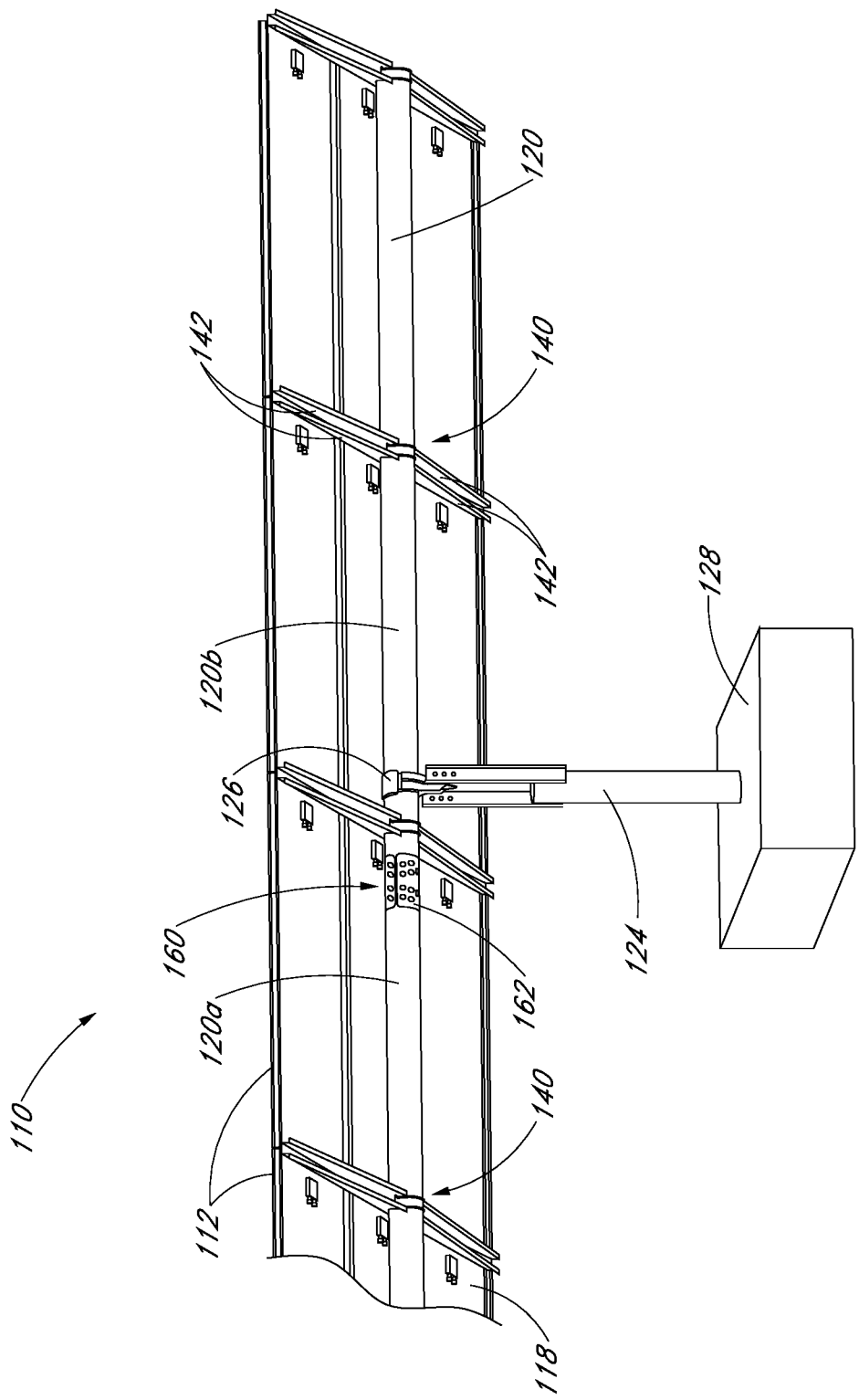
FIG. 4 illustrates a side perspective view of a tracker row, according to an embodiment.

FIG. 4 illustrates a side perspective view of a tracker row 110 tilted such that lower surfaces 118 of solar modules 112 are visible. Tracker row 110 comprises a plurality of mounting assemblies 140 configured to attach support frames of the plurality of solar modules 112 to the torque tube 120. In the example of FIG. 4, solar modules are configured such that three solar modules extend lengthwise across torque tube 120, however any other desirable configuration can be used. Also illustrated in FIG. 4 is a coupling assembly 160 coupling adjacent torque tube sections.

Detailed descriptions of various embodiments of mounting assemblies 140 and coupling assemblies 160 are described below with reference to FIGS. 1-4.

Figure 5:
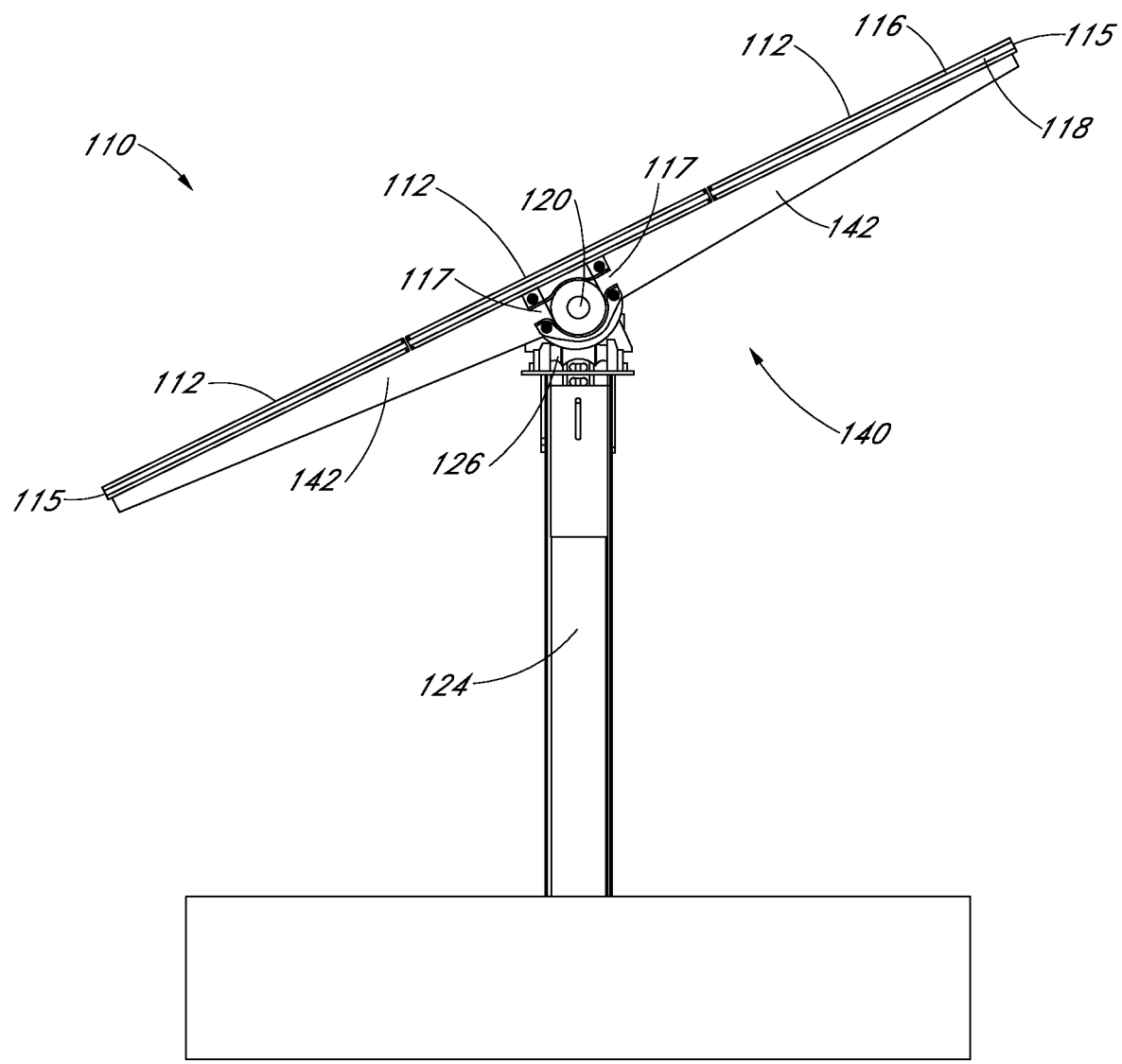
FIG. 5 depicts a side view of tracker row, according to an embodiment.

FIG. 5 illustrates a side view of a tracker row 110 comprising a plurality of solar collection modules 112, each having an upper surface 116 facing the sun and a lower surface 118 opposite the upper surface 112. Tracker row 110 comprises a mounting assembly 140 configured to attach the plurality of solar modules 112 to the torque tube 120. The mounting assembly 140 comprises a plurality of strut members 142. From the perspective of FIG. 5, only two strut members are visible, however additional strut members can be present. For example, four strut members 142 can be provided as depicted in FIG. 4.

Each of the plurality of strut members extend from the torque tube 120 to at least one support frame of a solar module 112. In the embodiment depicted in FIG. 5, each strut member 142 comprises an outer edge or first end 115 coupled to a solar module 112 and a second end 117 opposite the first end 115 coupled to the torque tube 120. Strut members 142 can be coupled directly or indirectly to solar modules 112 at any desirable point or region of the solar module by any desirable fastener or connector.

Figure 6:
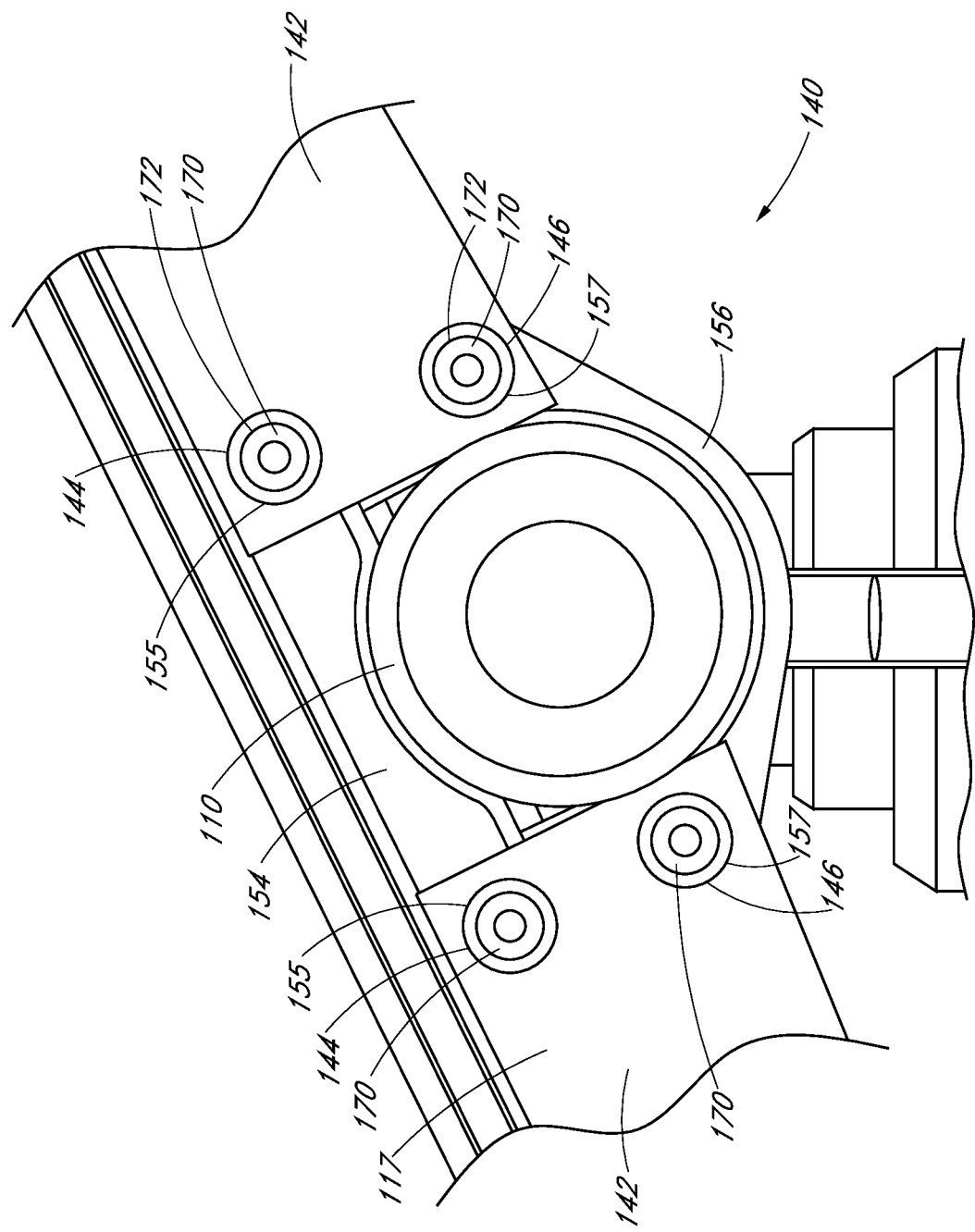
FIG. 6 side view of a mounting assembly, according to an embodiment.

FIG. 6 depicts a magnified side view of a mounting assembly 140 comprising a plurality of strut members 142. Each strut member 142 comprises an upper aperture 144 and a lower aperture 146 located at an end region proximate to the torque tube 120. The mounting assembly 140 further comprises saddle members, or solar module retention members, fixed to torque tube 120. An upper saddle member 154 extends across an upper portion of the torque tube 120 and a lower saddle member 156 extends across a lower portion of the torque tube 120. The upper saddle member comprises upper saddle apertures 155 in alignment with upper apertures 144 of strut members 142. The lower saddle member 156 comprises lower saddle apertures 157 in alignment with lower apertures 146 of strut members 142.

In at least some embodiments, saddle members and/or strut members are made of one piece of a metal sheet (e.g., a steel metal sheet) to increase rigidity. In at least some embodiments, the metal sheet may be a metal, a metal alloy or a compound. The metal sheet may include, for example, steel, copper (Cu), nickel (Ni), cobalt (Co), chromium (Cr), iron (Fe), titanium (Ti), aluminum (Al), or any combination thereof.

In an embodiment, mounting assembly 140 further comprises a plurality of hollow fasteners 170 extending through upper apertures 144/155 and lower apertures 146/157. Each hollow fastener 170 comprises at least one annular flange 172 which engages an exterior surface of a corresponding strut member 142. The annular flange 172 of the hollow fastener 170 is swaged to fixedly couple the strut members 142 and saddle members 154/156 to the torque tube 120.

For ease of description, two strut members 142 each having two apertures 144/146, two saddle members 154/156 each having two apertures 155/157, and four hollow fasteners 170 are shown in FIG. 5, however it should be appreciated that any desired number of strut members, saddle members, apertures, and/or hollow fasteners can be used to mount solar modules 112 to torque tube 120.

Figure 7:
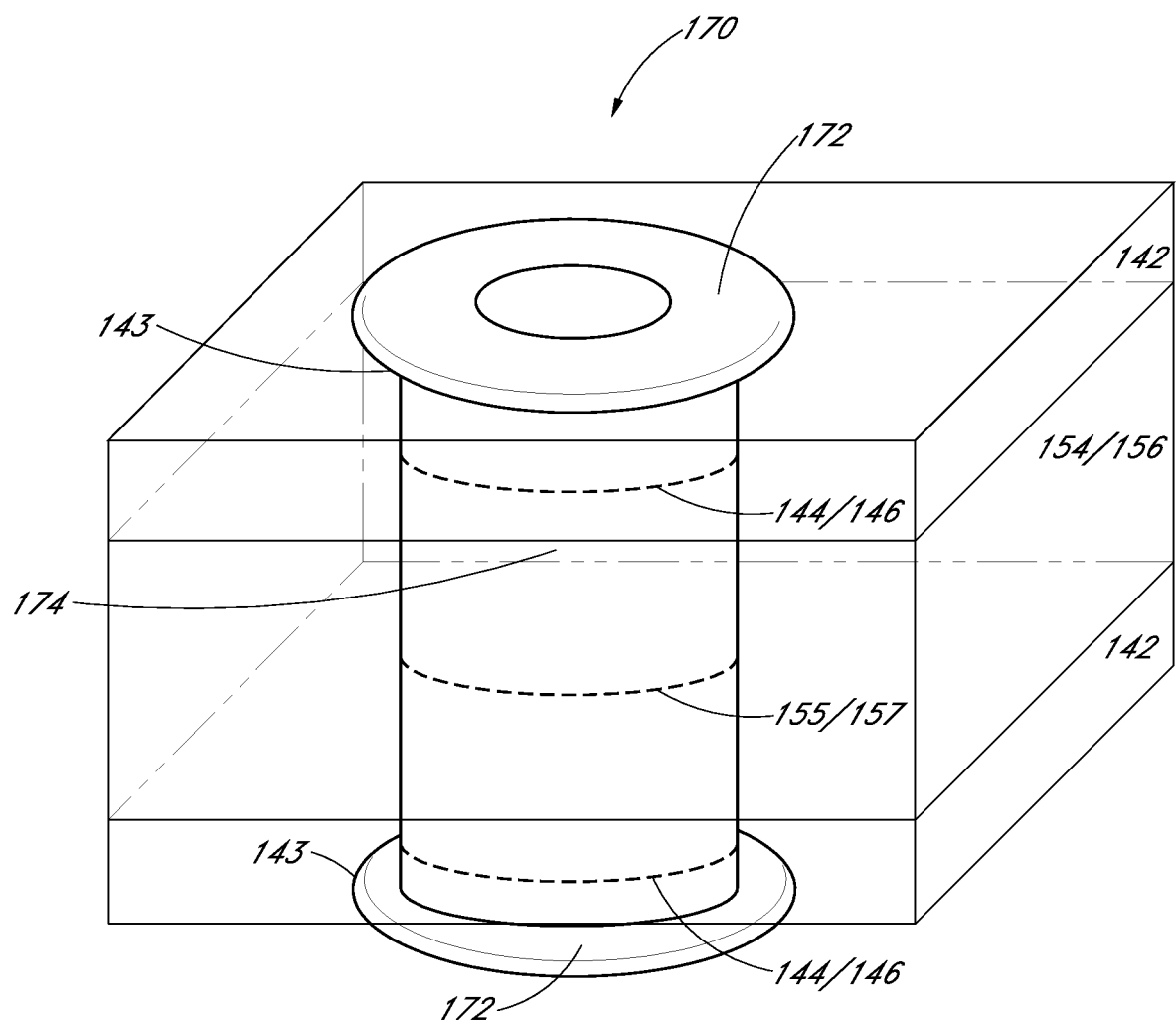
FIG. 7 depicts a perspective view of a mounting assembly, according to an embodiment.

FIG. 7 depicts a perspective cross-sectional view of a mounting assembly comprising a hollow fastener 170 extending through two strut members 142 and an upper or lower saddle member 154/156. Each hollow fastener 170 comprises a tubular body portion 174 between two annular flanges 172. Each annular flange 172 engages an exterior surface of a corresponding strut member 142. In an embodiment, the exterior surface of strut member 142 provides a mating region or annular bearing surface 143 onto which each annular flange 172 is swaged.

In an embodiment, the hollow fastener 170 can comprise a tubular or cylindrical body portion having any cross-sectional shape, including but without limitation, round, square, triangular, rectangular, polygonal, or other shapes. An embodiment, the hollow fastener is made of a single metal tube (e.g., a steel metal sheet). In at least some embodiments, the metal tube may be a metal, a metal alloy or a compound. The metal sheet may include, for example, steel, copper (Cu), nickel (Ni), cobalt (Co), chromium (Cr), iron (Fe), titanium (Ti), aluminum (Al), or any combination thereof.

It should be appreciated that the use of a hollow fastener can significantly lower the cost of solar tracker mounting and coupling assemblies. Compared to conventional fasteners or screws, a hollow fastener of the present disclosure can be provided with a small amount of fastening material (e.g., metal) while still maintaining strength and structural integrity of the mounting or coupling assembly. As a non-limiting example, the tubular body portion of the hollow fastener can have a diameter greater than 1 cm and a wall thickness less than 10 mm, or in some embodiments the wall thickness can be less than 6 mm.

In one embodiment, annular flanges can be integrally formed with the tubular body, for example as depicted in FIG. 6-7. However in other embodiments, the annular flanges can be formed separately from the tubular body portion of the hollow fastener.

In the embodiments depicted in FIG. 5-7, the hollow fastener 170 fixedly couples the strut members 142 and saddle members 154/156 to the torque tube 120, but does not directly extend into the torque tube 120. However, in other embodiments, a hollow fastener can directly engage and/or extend through at least one aperture of a torque tube.

FIG. 1-7 illustrate solar collection systems and mounting assemblies according to various embodiments. Unless otherwise designated, the components of FIG. 8-10 are similar, except that they have been incremented sequentially by 100.

Figure 8:
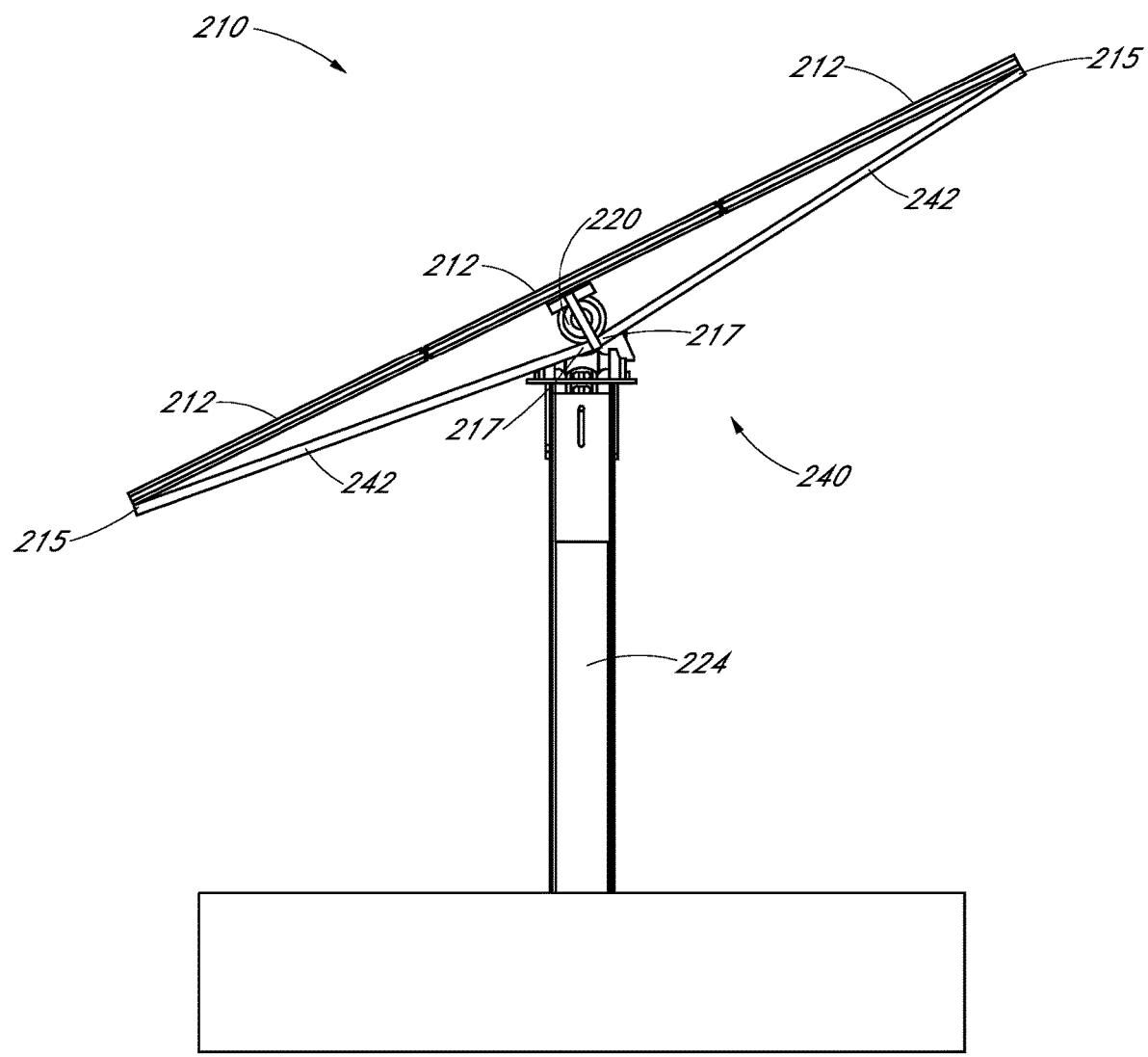
FIG. 8 depicts a side view of a tracker row, according to an embodiment.

FIG. 8 illustrates a side view of a tracker row 210 comprising a plurality of solar collection modules 212. Tracker row 210 comprises a mounting assembly 240 configured to attach the plurality of solar modules 212 to the torque tube 220. The mounting assembly 240 comprises a plurality of strut members 242 configured to mount solar cell modules 212 onto torque tube 220. Each of the plurality of strut members 242 extend from the torque tube 220 to a support frame of a solar module 212 at first ends 215. The strut members 242 are coupled to the torque tube 220 at a second end 217 opposite the first end 215.

Figure 9:
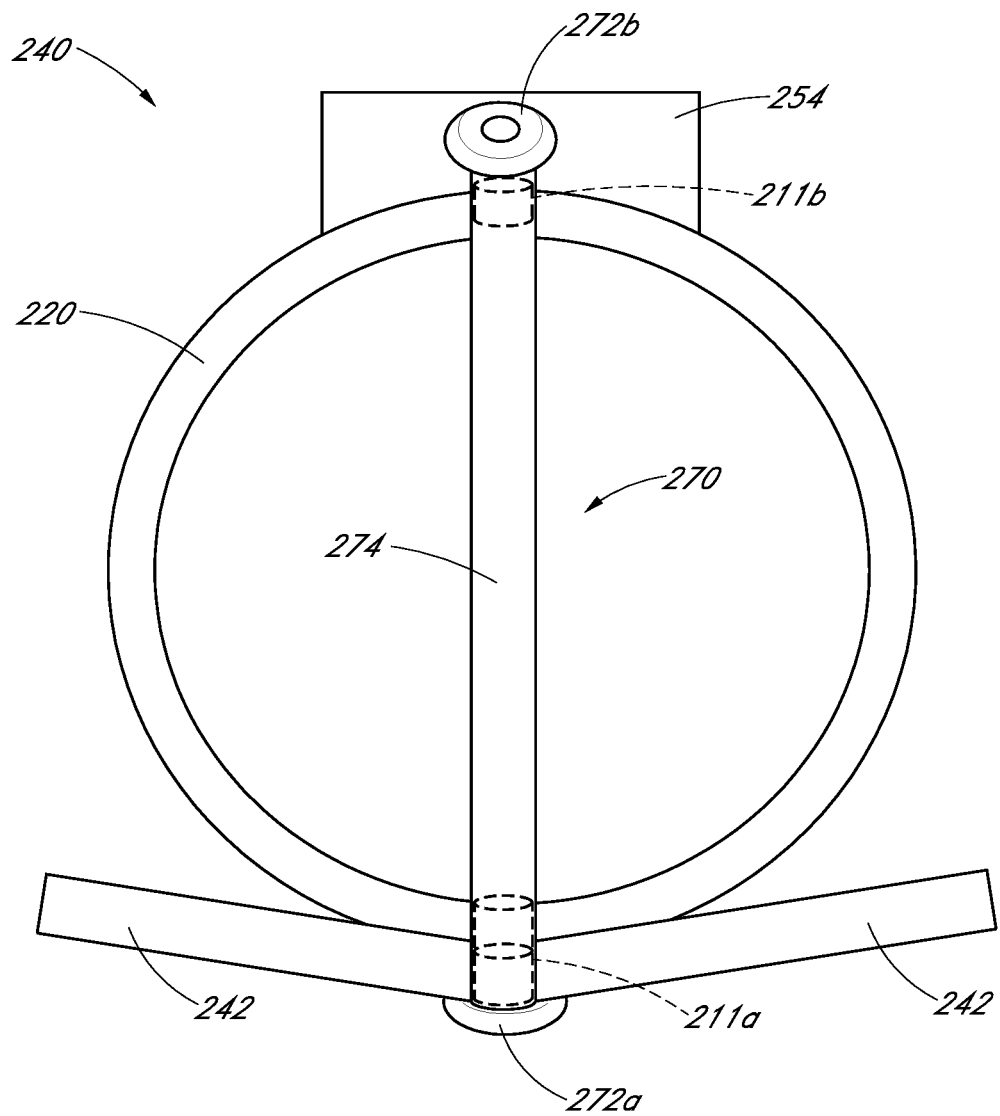
FIG. 9 depicts a cross-sectional view of a mounting assembly, according to an embodiment.
Figure 10:
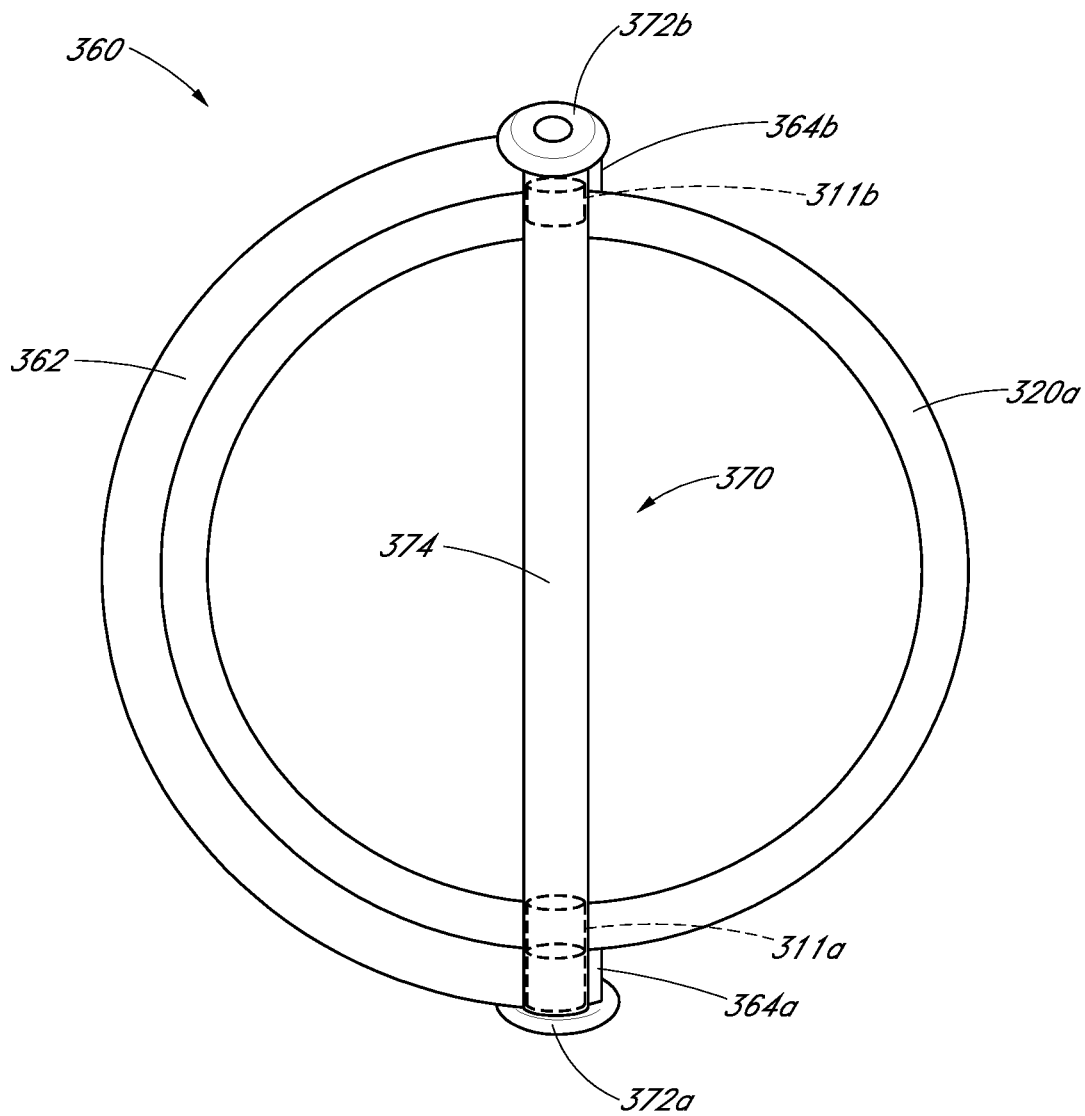
FIG. 10 depicts a cross-sectional view of a coupling assembly, according to an embodiment.

FIG. 9 depicts a side view of mounting assembly 240 comprising a hollow fastener 270 extending substantially through a two strut members 242, a torque tube 220 and an upper saddle member 254. The hollow fastener 270 comprises a tubular body portion 274 between an upper annular flange 272a and a lower annular flange 272b. The tubular body portion 274 extends through the torque tube 220 and through upper and lower apertures 211a/211b of torque tube 220. The lower annular flange 272a extends through strut members 242 and is swaged to engage an exterior surface of at least one strut member 242. The upper annular flange 272b extends through an upper saddle member 254 and is swaged to engage an exterior surface of the saddle member 254. In the embodiment of FIG. 9, the annular flanges of the hollow fastener engage exterior surfaces of strut and saddle members, however in other embodiments, annular flange of a hollow fastener can directly engage the torque tube, a solar module, or any other desired component.

Referring again to FIG. 4, coupling assembly 160 couples adjacent torque tube sections 120a and 120b to form a continuous torque tube 120. The coupling assembly 160 comprises a torque transmission member or coupling member 162 spanning across and fixedly coupling adjacent ends of torque tube sections 120a/120b together to form continuous torque tube 120.

FIG. 10 depicts a side cross-sectional view of a coupling assembly coupling adjacent torque tube sections according to one embodiment. As depicted, the coupling assembly 360 comprises a hollow fastener 370 extending substantially through a first aperture 364a of coupling member 362, a first torque tube section 320a and a second aperture 364b of coupling member 362. Similarly, another hollow fastener can extend substantially through a second adjacent torque tube section and third and fourth apertures of coupling member 362 (not visible in side cross-sectional view of FIG. 9). The hollow fastener 370 comprises a hollow body 374 between a first annular flange 372a and a second annular flange 372b. In an embodiment, annular flanges 372 of the hollow fastener 370 are swaged to engage exterior surfaces of the coupling member 362, thereby coupling adjacent torque tube sections across which the coupling member 362 spans.

In at least some embodiments, coupling members are made of one piece of a metal sheet (e.g., a steel metal sheet) to increase rigidity. In at least some embodiments, the metal sheet may be a metal, a metal alloy or a compound. In one embodiment, the coupling member is a curved plate extending between adjacent torque tube sections, such as depicted in FIG. 4 and FIG. 10. However in other embodiments, the coupling member can be provided as a bar, rod or in any other desired form or geometry.

For ease of description, only one coupling member 362 and one hollow fastener 372 is shown in FIG. 9, however it should be appreciated that any desired number of coupling members, coupling member apertures, torque tube apertures and/or hollow fasteners can be used to couple adjacent torque tube sections together to form a continuous torque tube.

In an embodiment, a swaging method can be used to assemble the mounting and/or coupling assemblies described above. A method for assembling a solar collection system can include a step of deforming an end portion of a hollow fastener, wherein the end portion is deformed to produce an annular flange. During swaging, the end portion of the hollow fastener can be worked or moved axially over an exterior surface of a strut member, a torque tube and/or a coupling member to produce a swaged connection between therebetween. In an embodiment, any desirable swaging tool can be used to produce a radial force for deforming an end portion of the hollow fastener outwardly across a surface of a strut member, coupling member and/or torque tube to make a swaged connection between them. The method can further include the steps of forming an aperture in a strut member, a torque tube and/or a coupling member. Additionally, the method can include the step of inserting a hollow fastener through an aperture in a strut member, a torque tube and/or a coupling member.

An aspect of at least one of the embodiments disclosed herein includes the realization that certain components of solar power systems, such as those components used to attach solar collection devices to pivoting structural members such as torque tubes, can be made at lower costs than known designs.

The above specification and examples provide a complete description of the structure and use of illustrative embodiments. Although certain embodiments have been described above with a certain degree of particularity, or with reference to one or more individual embodiments, those skilled in the art could make numerous alterations to the disclosed embodiments without departing from the scope of this invention. As such, the various illustrative embodiments of the methods and systems are not intended to be limited to the particular forms disclosed. Rather, they include all modifications and alternatives falling within the scope of the claims, and embodiments other than the one shown can include some or all of the features of the depicted embodiment. For example, elements can be omitted or combined as a unitary structure, and/or connections can be substituted. Further, where appropriate, aspects of any of the examples described above can be combined with aspects of any of the other examples described to form further examples having comparable or different properties and/or functions, and addressing the same or different problems. Similarly, it will be understood that the benefits and advantages described above can relate to one embodiment or can relate to several embodiments. For example, embodiments of the present methods and systems can be practiced and/or implemented using different structural configurations, materials, and/or control manufacturing steps. The claims are not intended to include, and should not be interpreted to include, means-plus- or step-plus-function limitations, unless such a limitation is explicitly recited in a given claim using the phrase(s) "means for" or "step for," respectively.

The invention claimed is:

1. A sun-tracking photovoltaic solar collector array comprising:
    a torque tube having a longitudinal axis supported above the ground so as to be pivotable through a range of pivot motion of at least about 20° of rotation about the longitudinal axis;
    a plurality of solar modules, each comprising a solar collection member including an upper surface configured to receive sunlight for conversion into electrical energy and a lower surface opposite the upper surface, each of the plurality of solar modules also comprising a support frame connected to the lower surface of the solar collection member;
    a plurality of mounting assemblies configured to attach support frames of the plurality of solar modules to the torque tube, each mounting assembly comprising:
    a plurality of strut members, each extending from the torque tube to at least one support frame of the plurality of solar modules, each of the plurality of strut members also comprising an upper aperture and a lower aperture located at a first end proximate to the torque tube;
    an upper saddle member extending across an upper portion of the torque tube, the upper saddle member a unitary body continuous across the upper portion of the torque tube, and the upper saddle member comprising upper saddle apertures in alignment with upper apertures of the plurality of strut members;

a lower saddle member extending across a lower portion of the torque tube, the lower saddle member a unitary body continuous across the upper portion of the torque tube, and the lower saddle member comprising lower saddle apertures in alignment with lower apertures of the plurality of strut members, wherein the lower saddle member has a width across the lower portion of the torque tube greater than a width of the upper saddle member across the upper portion of the torque tube;

wherein the upper and lower saddle members are indirectly coupled to the torque tube with at least one of the plurality of strut members coupled there between.

2. The system according to claim 1, wherein the torque tube has a cylindrical wall with a thickness less than 0.75 cm.

3. The system according to claim 1, wherein the torque tube has diameter greater than 10 centimeters.

4. The system according to claim 1, wherein the upper and lower saddle members are not in direct contact with one another.

5. A solar energy collection system comprising:
a first torque tube;
a plurality of solar modules, each comprising a support frame;
a mounting assembly configured to attach support frames of the plurality of solar modules to the first torque tube; the mounting assembly comprising:
a plurality of strut members; each extending from the first torque tube to at least one support frame of the plurality of solar modules and comprising at least one aperture;
at least one hollow fastener located in the at least one aperture and extending therethrough;
wherein the at least one hollow fastener comprises a tubular body portion between two annular flanges, each annular flange engaging an exterior surface of a corresponding strut member, and, wherein the exterior surface of a corresponding strut member provides a mating region onto which each annular flange is swaged,
wherein the mounting assembly further includes a first saddle member and a second saddle member opposite the first saddle member, the first and second saddle members extending across the first torque tube, and wherein the first saddle member has a width across a lower portion of the torque tube greater than a width of the second saddle member across an upper portion of the torque tube, and
wherein the hollow fastener indirectly couples the first and second saddle members to the torque tube with at least one of the plurality of strut members coupled there between.

6. The system according to claim 5, wherein the first torque tube has a cylindrical wall with a thickness less than 0.75 cm.

7. The system according to claim 5, wherein the first torque tube has diameter greater than 10 centimeters.

8. The system according to claim 5, wherein the tubular body portion of the hollow fastener has a diameter greater than 1 centimeter.

9. The system according to claim 5, wherein the tubular body portion of the hollow fastener has a cylindrical wall with a thickness less than 6 mm.

10. The system according to claim 5, wherein the first and second saddle members are not in direct contact with one another.

11. A solar module mounting assembly comprising:
a torque tube;
a plurality of solar modules,
a plurality of strut members, each of the plurality of strut members extending from the torque tube to at least one of the plurality of solar modules,
a first saddle member,
a second saddle member extending across the torque tube opposite from the first saddle member,
wherein the first and second saddle members are indirectly coupled to the torque tube with at least one of the plurality of strut members coupled there between.

12. The assembly according to claim 11, wherein the torque tube has a cylindrical wall with a thickness less than 0.75 cm.

13. The assembly according to claim 11, wherein the torque tube has diameter greater than 10 centimeters.

14. The assembly according to claim 11, wherein the first and second saddle members are each formed as a unitary body.

15. The assembly according to claim 11, wherein the first saddle member has a width across the torque tube greater than a width of the second saddle member across the torque tube.

16. The assembly according to claim 11, wherein the first and second saddle members each comprise one or more apertures in alignment with one or more apertures of the plurality of strut members, and wherein one or more fasteners extend through the one or more apertures of the first and second saddle members and the plurality of strut members in alignment.

17. The assembly according to claim 16, wherein at least one of the one or more fasteners is a hollow fastener comprising a tubular body portion between two integrally formed annular flanges.

18. The assembly according to claim 17, wherein the exterior surface of a corresponding strut member provides a mating region onto which each annular flange is swaged.

19. The assembly according to claim 17, wherein the tubular body portion of the hollow fastener has a diameter greater than 1 centimeter.

20. The assembly according to claim 11, wherein the first and second saddle members are not in direct contact with one another.

* * * * *